Aug. 6, 1968  K. H. BURGIN  3,395,523
CITRUS FRUIT HARVESTER
Filed April 10, 1967  2 Sheets-Sheet 1

INVENTOR.
KERMIT H. BURGIN
BY Herbert A. Venturi
ATTORNEY

Aug. 6, 1968    K. H. BURGIN    3,395,523
CITRUS FRUIT HARVESTER
Filed April 10, 1967    2 Sheets-Sheet 2

INVENTOR.
KERMIT H. BURGIN
BY
Herbert A. Weinturn
ATTORNEY

… … …

United States Patent Office 3,395,523
Patented Aug. 6, 1968

3,395,523
CITRUS FRUIT HARVESTER
Kermit H. Burgin, R.R. 1, Box 212, Whitestown,
Boone County, Ind. 46075
Filed Apr. 10, 1967, Ser. No. 629,768
10 Claims. (Cl. 56—328)

ABSTRACT OF THE DISCLOSURE

A fruit picker head wherein there is a trough open along the top; there is one or more belts with laterally spaced apart flights extending longitudinally along and within the trough to receive and spin fruit between the flights; a conveyor in the trough below the flights; and means yieldingly permitting rocking of the trough vertically; and means rocking the trough transversely.

Specification

This invention involves a combination of elements arranged as a picker head to twist citrus fruit including oranges and grapefruit among other fruits and laterally vibrating them to sever them from their tree attachments without pulling out the core plugs or otherwise damaging the fruit.

The mechanism involving the invention harvests the fruit without damaging the trees, and without removing small undersized fruits and buds and blooms for later fruit.

Simplicity and light weight are also important features of the inventive structure. There are a minimum number of working parts. The structure lends itself to relatively low cost of production and easy manipulation. The picker head is normally attached to the boom of a tractor for up and down and sidewise movement to carry the head into and out of the foliage of the fruit bearing trees whereby heavy branches of the trees may be by-passed and avoided in the approach of the head to the fruit in its widespread distribution, singly and in groups about the trees.

The invention is described herein in one particular form as now best known to me and without limitation thereto, as illustrated more or less diagrammatically in the accompanying drawings in which.

Figure 1:
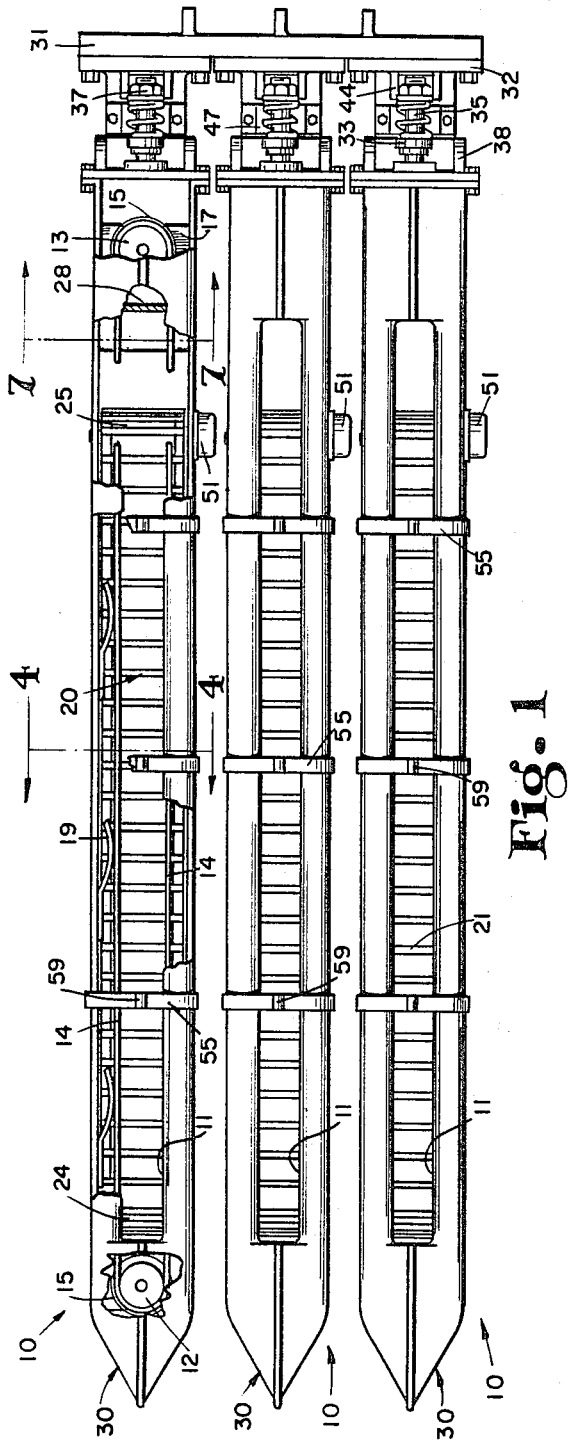
FIG. 1 is a top plan view of a picker head with portions broken away employing three picker units, each embodying the invention.
Figure 2:
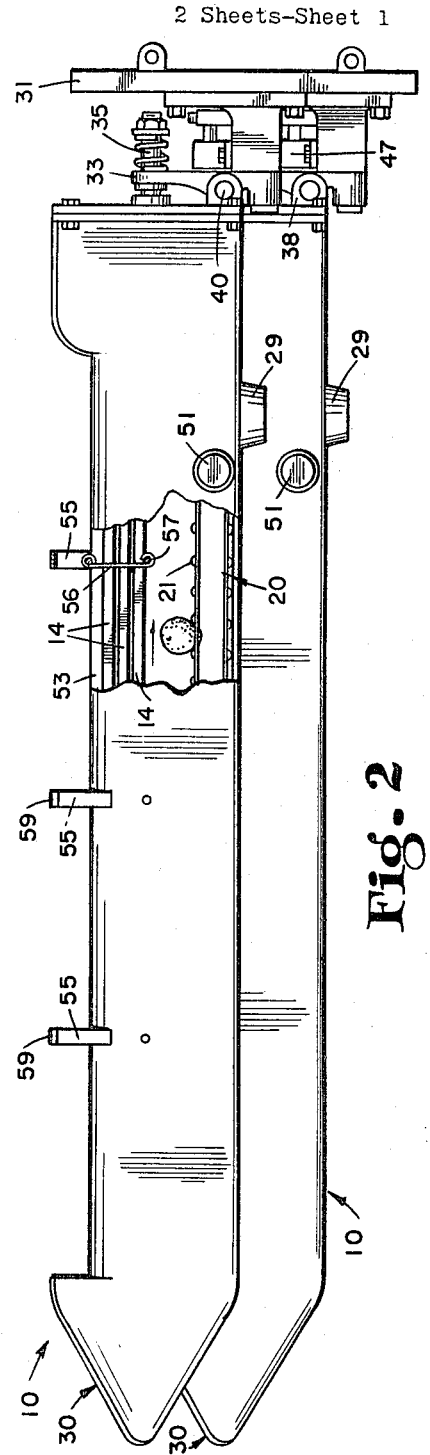
FIG. 2 is a view in side elevation of the head with portions broken away.

A trough 10, generally rectangular in cross-section and of a suitable length such, for example only, of about three feet, is formed to have a central, longitudinal top opening 11 sufficiently wide to receive freely therethrough the largest diameters of the fruit being harvested. This width may, of course, be varied, such, for example, by use of a deflectable top having the opening width preferred.

A pair of pulleys 12 and 13 are mounted within the trough, one toward each trough end to rotate about approximately vertical axes. One or more flexible belts 14, herein shown as three, are entrained one below the other about these pulleys, thereby setting up belt flights spaced apart a distance laterally of the trough in accordance with the pulley diameters. The pulleys are preferably supplied with rings 15 extending circumferentially around the pulleys, spaced apart vertically a distance to receive a belt therebetween for the purpose of directing the travel of a belt without any appreciable movement up and down along the pulley in each instance. One of the pulleys, herein shown as pulley 13, is driven such as by a hydraulic motor 16 which conveniently may be concealed within the trough 10.

Figure 7:
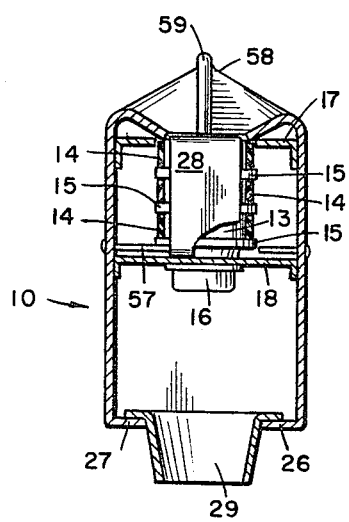
FIG. 7 is a transverse, vertical sectional view on an enlarged scale on the line 7—7 in FIG. 1.

Referring to FIG. 7, the pulley 13 is rotatably mounted between upper and lower, transverse members 17 and 18 in turn secured to the side walls of the trough 10, and the motor 16 is below the member 18 and drivingly connected to the pulley 13. The other pulley 12 is mounted in approximately the same manner, but without a motor, within the forward end portion of the trough 10. The belts 14 need be stretched between the pulleys 12 and 13 merely sufficiently to be driven so that the flights between pulleys may yield one from the other. Means may be employed between the side walls of the trough 10 and the belt flights yieldingly resisting this pressing thereof from straight line travel. One such means herein shown comprises a number of light tension leaf springs 19 fixed to a side wall of the trough 10 and extending in the belt flight travel direction sufficiently close to the flight to restrain yieldingly the pressing of that flight thereagainst.

Below the belts 14, there is an endless conveyor generally designated by the numeral 20 and preferably having cross slats 21 extending crosswise of the trough and spaced apart along and fixed by their ends to flexible belts 22 (chains or textile straps), the conveyor thus being open between the slats 21. The conveyor top flight has its belts 22 respectively riding on cleats 23 fixed along and to the opposite walls of the trough 10. Conveyor carrying pulleys 24 and 25 are mounted to extend transversely across and within the trough 10 at front and rear portions thereof with the conveyor entrained therearound. The under flight of the conveyor 20 is supported over an open bottom side of the trough by end portions of the slats 21 riding on inturned flanges 26 and 27 of the lower portions of the side walls of the trough 10. The conveyor is driven to have its top flight travel rearwardly by means of a hydraulic motor 51 herein shown as being mounted externally of the trough and driving the rear pulley 25.

A guard 28 hangs downwardly from the rear end of the trough top opening 11 in front of the belt pulley 13 as a protection from leaves and possibly twigs reaching the pulley. The rear conveyor pulley 25 is located ahead of the guard 28 a sufficient distance to permit the disengaged fruit to fall from the rear end of the conveyor downwardly through the trough 10 to a discharge spout 29, from which a suitable tube (not shown) may direct the fruit to a collecting means. Preferably the tube would be made of a flexible, textile material to avoid damage to the fruit.

Figure 4:
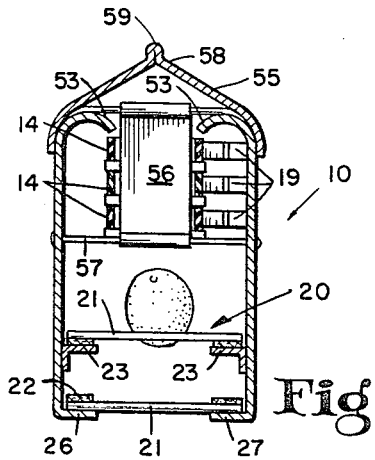
FIG. 4 is a view in transverse, vertical section through one unit on the line 4—4 in FIG. 1.
Figure 3:
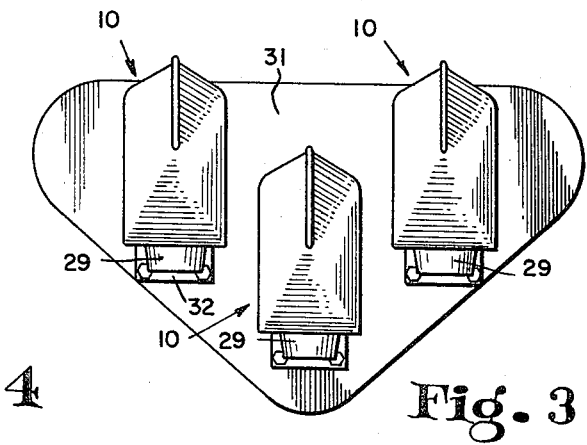
FIG. 3 is a view in front elevation of the head.

Attention is directed to the guards 55 which bridge the trough opening 11 at intervals therealong. A plate 56 is secured by its top end to the lips 53 to be positioned therebetween and extend downwardly in spaced relation by its vertical edges from the flights of the belts. The bottom edge of the plate 56 terminates above the top flight of the conveyor 20 a distance permitting an individual fruit, such as an orange, to be carried thereunder by the conveyor. Due to this construction, the fruit is prevented from being carried between the belt flights from end to end of the trough, and is confined in the compartments between adjacent plates 56 to drop therefrom. The lower end of the plate 56 is fixed to a rod 57 which extends transversely of the trough 10 and is fixed to the trough walls, see FIG. 4. These guards 55 additionally serve to space apart the trough side walls.

The top end portions of the guards 55 are each formed to extend upwardly to a peak 58 centered by its underside about three to four inches above the level of the top edges of the trough walls. The guard peak 58 rises about one-half of an inch above the surface of the guard to form an upper, external projection or nose 59 like a bullet nose. This nose serves as a means tending to part the leaves and branches as the unit 30 rises to direct them onto the sloping guard 55 and allow them to drop down the outer sides of the trough. In this manner this tree material is tended to be pushed away from the opening.

One or more of the picker units 30 so far described is mounted on and to extend from a supporting member 31 which would be secured to the boom of a tractor (not shown). Normally, each picker unit 30 would be secured by its rear end to the member 31 preferably to extend generally therefrom at a right angle. The mounting of the unit 30 in each instance is preferably yieldable vertically upwardly to provide for rocking downwardly of the unit 30 when it may be lifted upwardly against a large tree branch which would otherwise tend to cause damage to the unit. That is, there is imposed a shock absorbing mechanism between the unit 30 and the carrying member 31.

Figure 5:
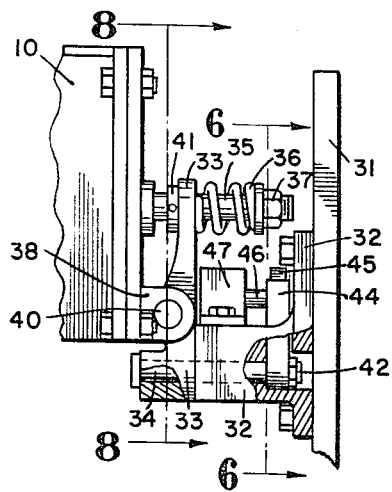
FIG. 5 is a detail in partial section on an enlarged scale of the unit supporting and vibrating mechanism.

This shock adsorbing mechanism, in one possible form, FIG. 5, comprises a base 32 fixed to the member 31; an upturned post 33 carried by the base 32 on a shaft 34 supported by the base to maintain the post 33 at a fixed spacing from the base 32; a bolt 35 fixed to the upper portion of the rear end of the trough 10 and extending rearwardly freely through the upper end of the post 33 a distance; a compression spring 36 coiled around that portion of the bolt which extends from the post 33; and a nut 37 screw-threadedly carried on the rear end of the bolt 35 as a means for compressing the spring 36 between the nut and the back side of the post 33. The lower portion of the back side of the trough 10 is vertically rockably supported by ears 38, 39 receiving ends of a transverse pin 40 carried by the post 33. Thus, if the front end portion of the unit 30 is relatively pushed downwardly, the spring 36 may be compressed from its normal state to allow the unit 30 to rock on the pin 40, and the spring 36 will return the trough 10 to its normal position, when the "push" is removed. This normal position is determined by a collar 41 carried on the bolt 35 between the post 33 and the back of the trough 10, the position being fixed by shifting the collar 41 along the bolt 35 to abut the post 33 where the collar 41 is then fixed to the bolt 35.

It is desirable to give the trough 10 a lateral, vibratory motion, not only to aid in moving the unit 31 through the tree branches, but also aiding in removing the fruit from its stem as will herein later be explained.

Figures 6, 8:
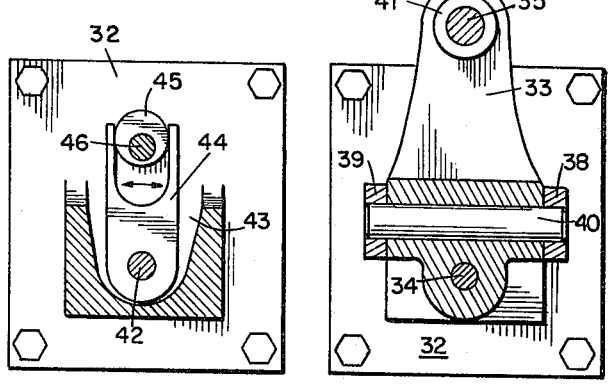
FIG. 6 is a transverse, vertical sectional view on the line 6—6 in FIG. 5.
FIG. 8 is a vertical sectional view on the line 8—8 in FIG. 5.

In the one form herein selected to illustrate a vibrating mechanism, the post 33 is fixed to its carrying shaft 34 which in turn is rotatably carried by the base 32, FIG. 5. A reduced diameter portion 42 of the shaft 34 enters a well 43, FIG. 6, in the base 32, where the lower end of a yoke 44 is fixed to the shaft portion 42 to extend upwardly therefrom to straddle a cam 45 fixed on a shaft 46 extending from a driving hydraulic motor 47 mounted on the base 32. The lateral oscillating, rocking motion tends to shift tree branches to allow the upward travel of the trough.

One or more of the units 30 may be mounted on the common supporting member 31. Three of the units 31 are herein shown to have two units 31 at a common elevation and one unit between and below the two upper units. One unit 31 will pick fruit, but the three will serve to speed up the picking operation. Also, by so locating the units 31, they may be manipulated up and down between and across branches of the trees, such, for example, as allowing the two upper widely spaced apart units to pass upwardly on sides of a heavy branch, and the lower central unit 31 to come up under that branch to reach fruit not available to the laterally spaced units. The lower unit 30 may have its top side from six to ten inches below the underside of the top units.

The front end of each unit 31 is preferably shaped for ease of penetration through the tree foliage. Also guards 55 are placed across and above the top opening 11 in the trough 10 in spaced relation as means to ward off entry of branches through the opening into the trough.

*Operation*

The member 31 is manipulated to guide the one or a multiple number of carried units 30 to the locations of the fruit on a tree preferably by pushing the picker heads into the lower part of the tree and then sweeping the picker head upwardly through the tree, while all the time the troughs 10 are rocking laterally.

Assuming that oranges are being picked, each orange should be twisted slightly and pulled in approximately a simultaneous action. The picker head receives an orange through the opening 11 guided somewhat by the downturned lips 53 along the opening 11 and reaching over to the upper edges of the upper belt 14. Preferably the opening 11 is a trifle greater in width than is the diameter of the orange. The orange, in a slightly swinging movement induced particularly by the lateral rocking or oscillation of the trough, will come into contact with either or both of the flights of the belts 14 to cause the orange to spin therebetween, while the downturned edges of the lips 53 will tend to increase the tendency of the orange to drop under the influence of gravity downwardly between the flights of the lower belts 14.

This combination of spinning and lateral and downward movement of the orange separates the orange from its stem much in imitation of the proper hand picking motions. The separated orange drops onto the conveyor below, and, since the conveyor top flight travels rearwardly, the orange is carried to the rear while resting on the slats 21 and dumped over the back pulley 25 to fall into the discharge spout 29. The reception of the fruit between the two belt flights is essential to the success of the picker.

Figure 9:
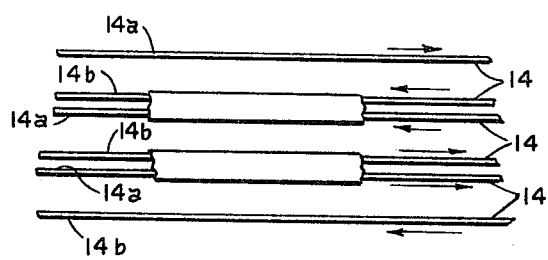
FIG. 9 is a diagrammatic view of a multiple number of belts arranged side by side wherein adjacent flights travel in common directions.

While a single belt assembly 14 has been shown, between the flights of which the orange is accepted, a plurality of side by side belts 14 in one grouping may be used, as diagrammatically shown in FIG. 9. Here three belts 14 are shown, each with its flights 14a and 14b travelling in opposite directions. Adjacent belt travel may be reversed one from another as, for example, is indicated by the arrows, whereby the belts may be in close proximity without friction of one flight over the adjacent one. Which way the orange spins is not of much importance.

While the invention has been illustrated and described in the one particular form, it would be obvious to make changes in the design without departing from the spirit of the invention, and therefore the invention is not intended to be limited to that specific form or to such changes which would be within the scope of the appended claims.

I claim:
1. A fruit picker head comprising
   a trough having a top opening;
   a belt carried by said trough and having a flight along each of opposite sides of said opening;
   means driving the belt to have the flights move in opposite directions;
   said belt flights being spaced apart to receive fruit therebetween and to spin the fruit coming into contact with at least one of the flights; and
   means in the lower portion of the trough receiving fruit dropping from between said flights and directing the fruit to a discharge zone.

2. The structure of claim 1, in which
said belt flights are spaced apart laterally a distance approximately equal to the diameter of the largest fruit to be harvested; and
there is a lip on each side of said opening extending laterally of the trough approximately to the top edge of each of said belt flights.

3. The structure of claim 2, in which
a conveyor comprises said fruit receiving and directing means; and
means driving said conveyor to have an upper flight travel toward said discharge zone.

4. The structure of claim 1, in which there is at least one belt below said first named belt with the flights of the lower belt aligned with and travelling in corresponding directions of flights of the belt thereabove.

5. The structure of claim 1, in which there is
a trough supporting member from which said trough longitudinally extends; and
shock absorbing means interposed between said trough and said supporting member.

6. The structure of claim 1, in which there is
a trough carrying member from which said trough extends; and
means carried by said member laterally vibrating said trough.

7. The structure of claim 6, in which
said opening extends longitudinally of said trough;
a lip defines each of the longitudinal sides of said opening;
each of said lips terminates with an edge portion directed toward the upper edge of a belt flight; and
said lips tend to keep said fruit between the belt flights and induce a fruit downward direction by said trough vibration.

8. The structure of claim 6, in which said vibrating means comprises
a head secured to said carrying member;
a shaft fixedly interconnected with said trough at its end adjacent said carrying member;
said shaft has its axis parallel with and offset from the central axis of said trough;
said shaft being rotatably carried by said head; and
shaft oscillating means interposed between said shaft and said head.

9. The structure of claim 3, in which
said trough is open along its under side; and
said conveyor comprises spaced apart transverse slats secured by ends to belts, the conveyor being open to discharge trash therethrough.

10. The structure of claim 1, in which there are
a plurality of guards extending across said top opening and carried by and longitudinally spaced apart along said trough;
each of said guards rising centrally above said opening into a nose projecting therefrom;
a partition member at each of said guards extending downwardly between said belt flights and terminating a distance above said fruit receiving means sufficient to allow the fruit to pass thereunder; and
means anchoring the lower end of each of said partition members to said trough.

References Cited
UNITED STATES PATENTS

| | | | |
|---|---|---|---|
| 2,698,508 | 1/1955 | Hollister | 56—332 |
| 2,968,141 | 1/1961 | McGough | 56—332 |
| 3,143,844 | 8/1964 | Polk | 56—328 |
| 3,161,007 | 12/1964 | Bergquist | 56—328 |

RUSSELL R. KINSEY, *Primary Examiner.*